H. K. DYSON.
METAL SLITTING MACHINE.
APPLICATION FILED JAN. 28, 1909.

955,776.

Patented Apr. 19, 1910.

2 SHEETS—SHEET 1.

Witnesses

Inventor
Herbert K. Dyson
By James L. Norris
Atty

H. K. DYSON.
METAL SLITTING MACHINE.
APPLICATION FILED JAN. 28, 1909.
955,776.
Patented Apr. 19, 1910.
2 SHEETS—SHEET 2.
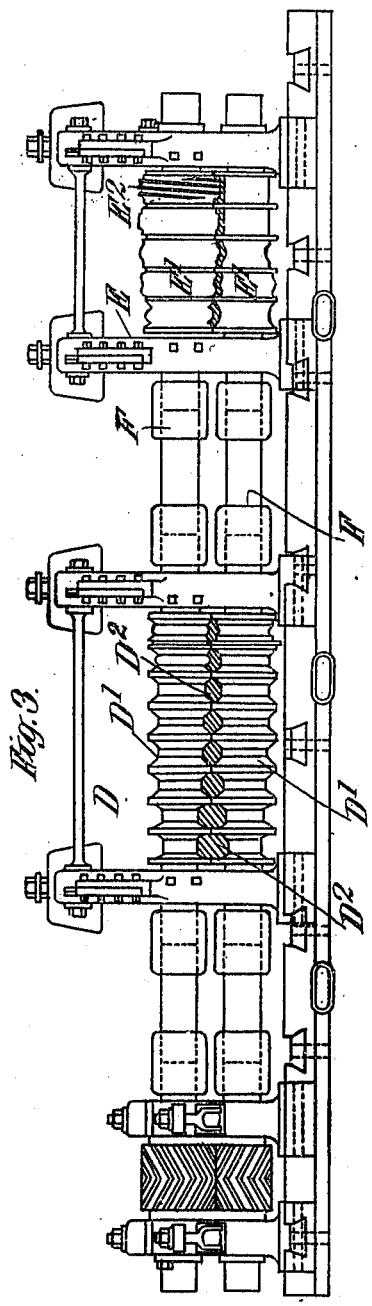
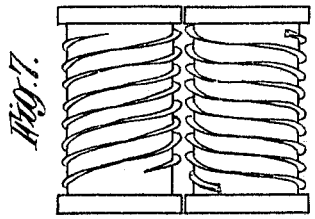
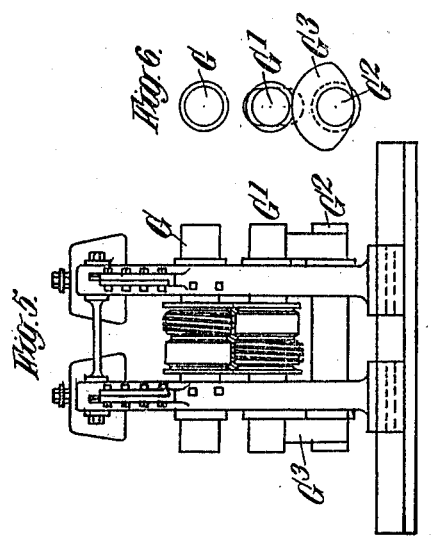
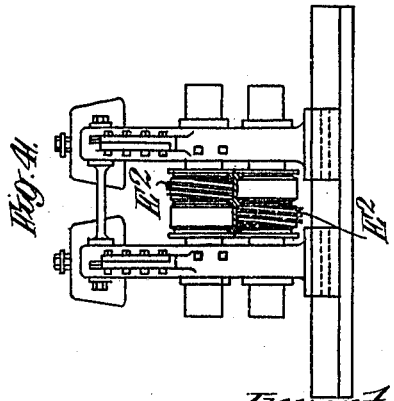
Witnesses:
Inventor
Herbert K. Dyson
By James L. Norris
Atty.

UNITED STATES PATENT OFFICE.

HERBERT KEMPTON DYSON, OF FINSBURY PARK, ENGLAND.

METAL-SLITTING MACHINE.

955,776.  Specification of Letters Patent.  Patented Apr. 19, 1910.

Application filed January 28, 1909. Serial No. 474,738.

*To all whom it may concern:*

Be it known that I, HERBERT KEMPTON DYSON, a subject of the King of Great Britain, residing at 73 Digby road, Finsbury Park, in the county of Middlesex, England, have invented certain new and useful Improvements in Metal-Slitting Machines, of which the following is a specification.

This invention relates to apparatus for slitting metals. In the manufacture of expanded metal the formation of rows of discontinuous longitudinal slits can be effected by passing the metal between rollers having discontinuous circular cutting edges formed on their periphery. I have been led, by the desire to cut a series of diagonal slits in a strip or sheet of metal for the purpose of forming an expanded metal reinforcement for concrete, to make the discovery that this can be readily done by passing the metal in contact with a roller having peripheral cutting edges arranged helically upon its surface like a sharp edged screw-thread the ends of the cutting edges not however extending to the edge of the end faces of the roller.

In order that the invention may be clearly understood and readily carried into effect I will proceed to describe the same more clearly with reference to the accompanying drawings, in which:—

Figure 1:
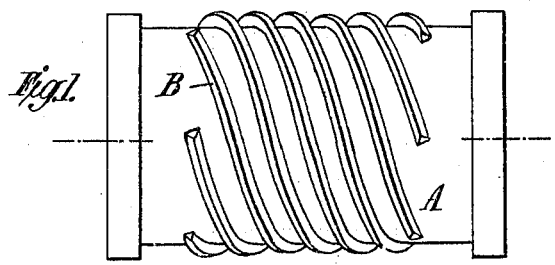
Figure 2:
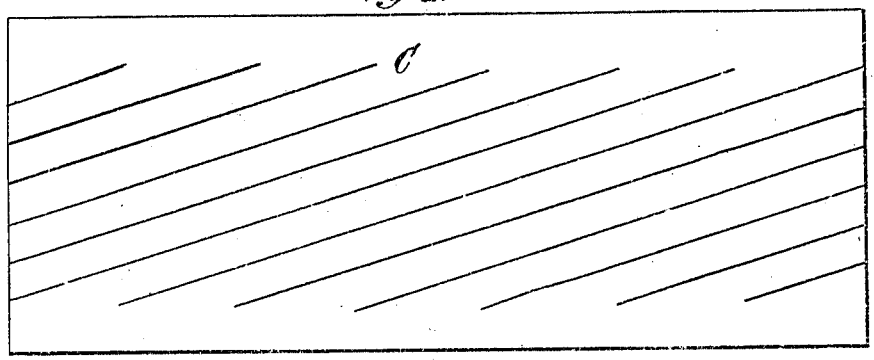

Figure 1 is a side elevation of a cutting or slitting roller formed in accordance with my invention. Fig. 2 is a plan of a strip of metal which has been slit by the action of a cutting or slitting roller such as shown in Fig. 1. Fig. 3 represents a rolling mill having one of its finishing rolls provided with spiral cutting edges in accordance with this invention; Fig. 4 represents an arrangement of slitting rolls independent of a rolling mill; Fig. 5 is a similar view to Fig. 4 of a modification in which the lower rolls may be moved toward and away from the upper rolls; Fig. 6 is a diagrammatic end view of part of the apparatus shown in Fig. 5; Fig. 7 represents a pair of rolls both of which are provided with spiral cutting edges.

Referring first to Fig. 1, A is a cutting or slitting roller having the cutting edges B projecting from its surface. The cutting edges are arranged spirally and it will be seen that there are several independent edges. Each cutting edge may be required to extend around the circumference of the roller one or more times according to the length of the slit or of the roller or the pitch of the spiral cutting edges. In order to insure that the slits that are made in the metal C do not extend to the edges of the strip of metal, the width of the area on which the cutting edges lie must not, measured in an axial direction with respect to the roller, be so great as the width of the strip of metal being operated upon; in Fig. 1, which shows a roller intended for slitting metal as wide as the distance between the flanges of the roller, the cutting edges on the rollers are not continued close up to the flanges or end faces thereof. The cutting or slitting operation may conveniently be performed while the metal is in a more or less plastic state in the rolling mills. For this purpose, one of the ordinary finishing rolls may be provided with the cutting or slitting edges as shown in Fig. 3, or one or more additional rollers as shown in Figs. 4 and 5 may be placed behind, at the side adjoining, or near the finishing rolls.

In Fig. 3, which represents a rolling mill, D is the standard supporting the cogging rolls D' for reducing the ingots or bars D² to approximately the desired sectional area, and E is the standard supporting the finishing rolls E'. The upper roll E² of the last pair of finishing rolls is provided with helical cutting or slitting edges as above described.

F F represent couplings through which the finishing rolls are driven.

In Fig. 4 the slitting rolls are shown as a separate piece of apparatus and two slitting rolls E² are shown, the cutting or slitting edges being on the lower roll of one pair of rolls and on the upper roll of the other pair of rolls. These rolls might be driven independently of the ordinary finishing rolls of the rolling mill or by a continuation of the shafting of the rolling mill.

In the arrangements shown in Figs. 3 and 4 the slitting of the metal as it passes beneath the cutting or slitting edges of the slitting roll or rolls is continuous throughout the strip or bar of metal because the shafts of the upper and lower rolls are in fixed bearings. In Fig. 5 however the shaft G of the upper roll is in a fixed bearing but the shaft G' of the lower roll is free to move vertically in slots in the standard.

$G^2$ is a shaft which is in a fixed bearing below the shaft $G'$ and carries two cams $G^3$ which bear upon the shaft $G'$. By this arrangement the slitting of the metal as it passes between the upper and lower rolls takes place only when the shaft $G^2$ is turned sufficiently to cause the cams $G^3$ to press the shaft $G'$ upward until the upper and lower rolls both bear upon the metal. The slitting operation can therefore be stopped or discontinued at any desired point in the length of the metal. Different lengths of slitted metal can be obtained by making the cams $G^3$ of different sizes and thereby keeping the lower rolls in contact with the upper rolls for a shorter or longer time.

When separate rolls are employed adjacent to the finishing rolls, the rolling mill operators pass the metal through these rollers immediately after it has passed through the finishing rolls, and from between the said separate rolls the metal passes in a finished state cleanly slit along diagonal lines.

Several independent spiral or helical cutting edges are preferable to one continuous edge, except when very long slits are required, because otherwise the diameter of the rolls has to be objectionably small. By arranging several sets of cutting edges side by side upon the slitting rolls, several rows of slits can be cut in the same sheet of metal, and by varying the pitch of the cutting edges, the diameter and length of the slitting rolls, or the number of independent cutting edges, any desired length, width, and number of slits can be cut at the desired inclination. If desired, both the upper and the lower rolls or rollers of a pair may be furnished with helical cutting edges as shown in Fig. 7.

What I claim and desire to secure by Letters Patent of the United States is:—

1. Means for slitting a strip of metal diagonally, comprising a roller in contact with which the strip is passed, and a helical peripheral cutting edge on the roller extending over an area the width of which measured in an axial direction with respect to the roller is less than the width of the strip to be slit.

2. Means for slitting a strip of metal diagonally, comprising a roller in contact with which the strip is passed, and a plurality of independent helical peripheral cutting edges on the roller extending over an area the width of which measured in an axial direction with respect to the roller is less than the width of the strip to be slit.

3. Means for slitting a strip of metal diagonally, comprising a pair of adjacent rollers between which the strip is passed, and a helical peripheral cutting edge on one of said rollers extending over an area the width of which measured in an axial direction with respect to the roller is less than the width of the strip to be slit.

4. Means for slitting a strip of metal diagonally, comprising a pair of adjacent rollers between which the strip is passed and a plurality of independent helical peripheral cutting edges on one of said rollers extending over an area the width of which measured in an axial direction with respect to the roller is less than the width of the strip to be slit.

5. Means for slitting a strip of metal diagonally, comprising a pair of adjacent rollers between which the strip is passed and a helical peripheral cutting edge on each of said rollers, extending over an area the width of which measured in an axial direction with respect to each roller is less than the width of the strip to be slit.

6. Means for slitting a strip of metal diagonally, comprising a pair of adjacent rollers between which the strip is passed, and a plurality of independent peripheral cutting edges on each of said rollers extending over an area the width of which measured in an axial direction with respect to each roller is less than the width of the strip to be slit.

In testimony whereof I affix my signature in presence of two witnesses.

HERBERT KEMPTON DYSON.

Witnesses:
WALTER J. SKERTEN,
T. SELBY WARDLE.